Sept. 4, 1956

M. P. GRAHAM 2,761,695

VEHICLE FRONT WHEEL SUSPENSION
MEANS WITH FRICTION JOINT
Filed July 24, 1952

Inventor:
Matthew P. Graham
by Hill, Sherman, Meroni, Gross & Simpson Attys

United States Patent Office 2,761,695
Patented Sept. 4, 1956

2,761,695

VEHICLE FRONT WHEEL SUSPENSION MEANS WITH FRICTION JOINT

Matthew P. Graham, Detroit, Mich., assignor to Thompson Products, Inc., Cleveland, Ohio, a corporation of Ohio Application July 24, 1952, Serial No. 300,643

8 Claims. (Cl. 280—96.2)

This invention relates to an improved joint assembly and more particularly to an improved joint assembly of the controlled-friction damping type for use in automotive independent wheel suspensions.

The joint assembly of the present invention is more particularly intended for use with pivotally connected steering knuckles of the type utilizing ball joints between the steering knuckle and the upper and lower control arms. The joint of the instant invention is constructed for use as the upper ball joint of such a front wheel suspension system and is arranged to dampen shimmy of the front wheels of a vehicle as the wheels roll along the road. The broad general combination thus far discussed has been known for some time and is rather throughly described in my earlier Patent No. 2,521,335 issued September 5, 1950. As stated in the specification of the above noted patent, the use of antifriction ball joints in both the upper and the lower joints of a front wheel suspension is impractical since, as was discovered in tests, it is impossible to obtain the necessary minimum damping force to prevent resonant vibrations causing dangerous wheel shimmy.

While the upper ball joint disclosed in the above noted patent has proved satisfactory, it was found to have several undesirable drawbacks. The generally rather severe shock vibrations imparted to the ball joints of the type of suspension herein involved cause difficulties with regard to the commonly used dirt seals such as indicated at 74, 76 of my prior patent. These seals utilize a rather weak spring to maintain a plurality of sealing members in position against the opening between the ball stud and the ball housing. Vibrations of a rather heavy nature may cause this seal to vibrate allowing road grit, etc. to penetrate the joint causing a substantial decrease in useful life of the device. A further feature of this prior invention was the necessity of a bulky spring cavity over the head 68a of the ball stud. The projection of the portion 79 above the housing wall 64 was necessary in order to provide room for a suitable heavy duty spring 78. Should a rock or other large object be thrown against the sheet metal casing 79, the spring seat may well be canted and the joint rendered inoperative as a dampening device. The construction shown in my earlier patent also required a very heavy spun down rim around the sheet metal cap 79 since the entire force of the heavy spring 78 acted to pry the cover 79 from the housing 64. In view of the extremely high safety factors necessary in the steering apparatus of modern high speed vehicles, the dependence of the joint shown in my earlier patent upon such a joint was felt to be somewhat unsatisfactory, especially in heavy duty installations.

It is therefore an object of the present invention to provide a novel compact joint assembly which is not susceptible to injury from flying objects and which is extremely safe and in which all severe stresses imposed by the heavy dampening spring are taken by heavy forged material.

It is a further object of my invention to provide an improved joint assembly of the controlled-friction shimmy damping type for use in heavy duty installations.

Yet another object of my invention is the provision of an improved shimmy damping type of ball joint in which the damping spring is disposed in an invulnerable spot.

Still another object of the present invention is to provide a joint assembly of the controlled friction shimmy damping type utilizing a different and novel construction arrangement materially increasing the safety factor.

Yet a further object of this invention is to provide a novel combined dirt seal and brake tensioning mechanism in joints for use in independent wheel suspensions.

Still a further object of this invention is to provide a superior, positively sealing, heavy duty dirt seal for use with ball joints.

Other objects and features of this invention will more fully appear from the following detailed description taken in connection with the accompanying drawings which illustrate several embodiments thereof and in which.

As shown on the drawings.

Figure 1:
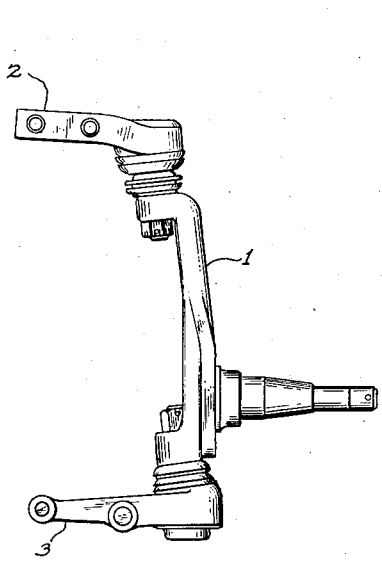
Figure 1 is a side elevation view of the present invention in use with the control arms and steering knuckle of a modern independent suspension system.

As shown in Figure 1, a steering knuckle of a now well known design 1 is connected at its upper end to a control arm 2 and at its lower end to a control arm 3. The connection between the steering knuckle and the lower control arm 3 may be of any general anti-friction ball type such as, for example, that disclosed in my prior Patent No. 2,521,335, issued September 5, 1950. The connection between the steering knuckle and the upper control arm 2, however, comprises a novel ball joint arrangement which is the subject of the instant invention.

Figure 2:
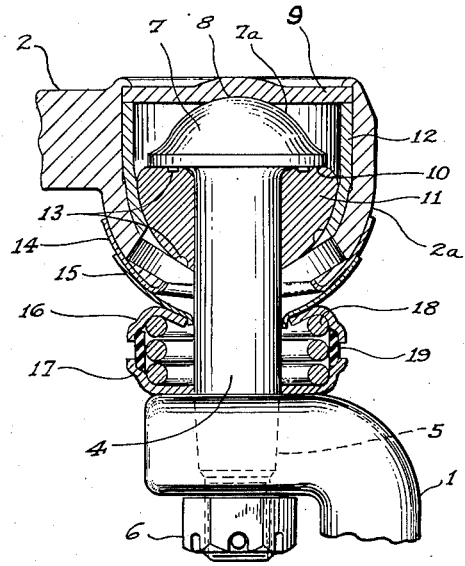
Figure 2 is an enlarged view of the steering knuckle, ball joint, upper control arm connection, in partial cross-section.

As shown in Figure 2, the steering knuckle 1 is joined to the upper control arm 2 through a ball joint. The joint comprises a stud member 4 having a tapered shank 5 which is inserted in a tapered hole in the steering knuckle 1 and fastened thereto in a semi-permanent manner by the fastener 6. At the other end of the stud 4, a generally hemispherical head 7 is provided. The arcuate surface 7a of the head 7 abuts against a mating cupped surface 8 formed in the closure 9. The under, flat surface 10 of the head 7 abuts against a flat damping surface of a hemispherical brake or friction member 11 which is positioned in the cup-shaped wear sleeve 12. Grooves 13 for the direction of lubricant to the mating surfaces are provided between the member 11 and the surface 10 of the head 7 and also between the member 11 and the cupped surface of the member 12.

Wide angle sealing means are provided in the form of cup-shaped seal washers 14 and 15, which allow wide variations in the tilting of the stud 4 with relation to the upper control arm 2 and housing 2a. Located between the washer 15 and the steering knuckle 1 are spring covers 16 and 17. Between these members a spring 18 of a rather substantial nature is provided, as well as a sealing member 19. The sealing member 19 is preferably made of a resilient material such as rubber or plastic and may either be compressed into position upon assembly of the joint or may be bonded to the covers 16 and 17 during manufacture.

In operation, the joint is assembled so that the stud 4 is drawn tightly into the steering knuckle 1. In this condition, the spring 18 is compressed, and applies a heavy force to the washers 15 and 14 pressing them tightly against the ball joint housing 2a of the control arm 2. At the same time, the reactive force tends to pull the stud 4 out of the socket, thereby forcing the head 7, and more particularly the head surface 10 tightly against the flat surface of the member 11 which in turn causes a frictional force tending to prevent rotation between head 7 and member 11. The member 11 is also in frictional engagement with the wear plate 12, with the result that a rather high frictional force is present which tends to prevent relative movement between the stud 4 and the housing 2 in either rotational or vertical pivotal movement.

This frictional retarding force is, of course, proportional to the strength of the spring 18 and may be modified to suit various vehicle requirements by substitution of springs 18 having various strengths. It is, of course, noted that it is undesirable to maintain too great a restrictive frictional force in the joint since easy steering requires a minimum of resistance to movement. Therefore, a spring 18 should be selected which will provide only that frictional force which is necessary to dampen out any tendency of the front wheel suspension to vibrate in resonance, so as to prevent shimmy action.

Figure 3:
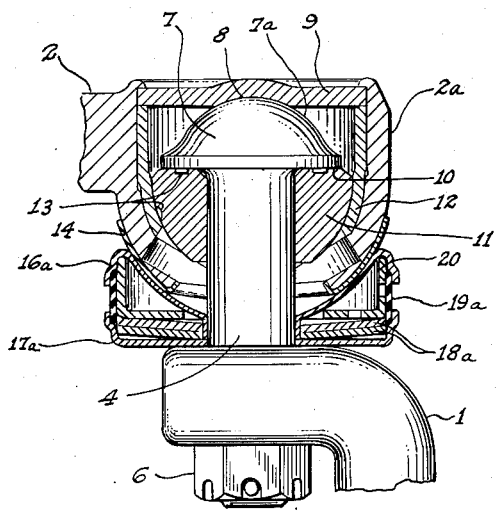
Figure 3 is a modification of the construction shown in Figure 2, utilizing a somewhat different spring and seal arrangement.

The modification shown in Figure 3 is similar in principle to that disclosed in Figure 2. However, a modified arrangement is provided wherein the washer 15 is eliminated and the cover 16a is pressed into double service. In this form, the cover 16a is cut generally in the cuperally in the cup-shaped manner above utilized in the washer 15 shown in Figure 2. A flat type spring 18a is utilized in this modification and is separated from the element 16a by means of a dished spacer 20. The lower spring cover 17a is generally the same as that utilized in the construction shown in Figure 2, as is the resilient sealing member 19a. In operation, the construction shown in Figure 3 is identical to that disclosed in Figure 2. However, use of the flat type spring allows a somewhat shorter stud and a correspondingly shorter and more compact ball joint. A further advantage of this modification is that it allows elimination of one of the washers, designated 15 in Figure 2. It should be noted, of course, that the elimination of the washer 15 may be accomplished without requiring the additional member 20 if it is desired to utilize the spring 18 as shown in Figure 2 or spring 18b disclosed in Figure 4.

Figure 4:
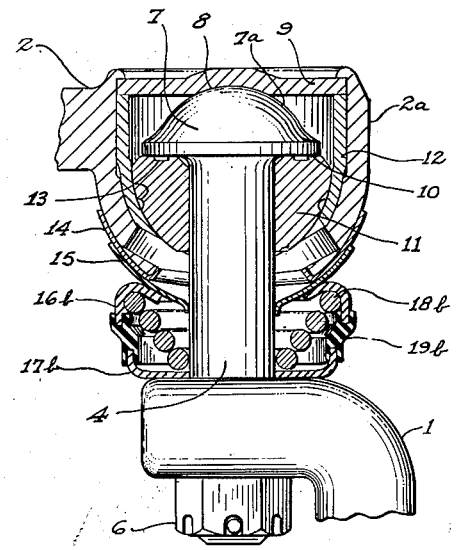
Figure 4 is yet another modification of the construction shown in Figure 2, showing still another arrangement of the spring and seal.

Figure 4 is generally the same as the arrangement disclosed in Figure 2 with the exception that the spring 18b is of the tapered helical type rather than a straight helix. This arrangement has the advantage of allowing a large number of helixes to be used in a small amount of space, a feature which allows a more resilient spring which may be desirable in certain installations. A further feature shown in this figure is the resilient seal 19b, which here is shown as a molded dual diameter seal. It is shown as bonded to the covers 16b and 17b, a technique discussed above.

It will be apparent from consideration of Figures 2 through 4 above discussed, that a novel and extremely desirable joint construction is herein disclosed. The spring 18, 18a and 18b must in each case be a rather heavy spring in order to properly dampen the severe vibration imparted to the front wheel suspension of automobiles or other vehicles in heavy duty service. By means of the construction herein disclosed, this heavy duty spring not only is directly operative to bias the friction surfaces of the ball joint into coaction but also is arranged so that it provides a very tight fitting seal which will prevent any grit whatever from entering the ball joint, even at times when the joint is under heavy vibration. The construction also is extremely compact in that it places the biasing spring between the ball joint housing and the steering knuckle. Aside from the compactness offered by this positioning, a higher degree of safety is provided since there is no possibility of a defect in the closure plate 9 having any crippling effect on the action of the joint. Even if the plate 9 should be lost completely, the joint is still operative, whereas such would not be the case in the prior art constructions in which the bias spring was placed between the closure plate and the stud head.

The only possible way that the joint of the instant invention could become inoperative would be for the member 11 to pull out of the socket in the downward direction. This is impossible since the curve of the member 11 is sufficient to prevent any such occurrence. It is also noted that the member 12 is made of an extremely hard metal such as case hardened or other treated metal so that wear is minimized. Upon the occasion of wear, however, the joint may be rebuilt into like-new usefulness by merely replacing the sleeve 12 by a new one. In connection with such a rebuilding, the turned-over edge which holds the plate 9 in place may be turned back by modern tools or the plate 9 may be threaded in position in the initial construction to allow its subsequent removal by ordinary tools.

It will be readily understood that modifications and variations may be effected without departing from the scope of the novel concepts of the present invention.

I claim as my invention:

1. In an independent wheel suspension, a controlled friction shimmy damping joint comprising a housing having a segmental spherically curved bottom therein, said bottom having an aperture therethrough, a hemispherically shaped friction member supported in said housing and having a flat upper surface, a stud having a head having an annular surface facing the flat surface of the hemispherical friction member for friction braking cooperation therewith and having a shank passing through said hemispherical member and through said aperture in said housing for connection to a steering knuckle, a friction brake force controlling spring means positioned between said housing and said steering knuckle and acting to force them apart, said spring means comprising the sole friction applying resilient force in said joint, a substantially rigid closure plate member secured in said housing and providing a top therefor, said last named member being positioned closely adjacent the head of said stud for direct contact therewith on the side thereof opposite from said annular surface and thereby preventing any substantial movement of said head and friction member away from said curved bottom.

2. A controlled friction shimmy-damping ball joint for use in independent wheel suspensions comprising, a housing having a friction member therein, said friction member having a hemispherical surface mating with a hemispherical surface in said housing, a stud having a shank, said friction member and said housing having aligned apertures through which said shank may pass, said friction member having a flat friction braking surface lying in a plane perpendicular to the axis of the aperture and hemispherical surface, and cooperating with a flat surface on the head of said stud to provide frictional resisting force between said stud and said friction member, a steering knuckle for attachment to said stud at the end opposite said head, sealing means between said housing and said steering knuckle and closely surrounding said stud, resilient friction controlling spring means between said seal means and said steering knuckle, said spring means comprising the sole biasing force in said joint, whereby both the friction dampening force and the sealing of said joint are maintained by said spring means, a substantially rigid closure plate member secured in said housing and providing a top therefor opposite to said hemispherical surface in said housing, said last named member being positioned closely adjacent the head of said stud for direct contact therewith on the side thereof opposite from said flat surface on the head of said stud and thereby preventing any substantial movement of said head and friction member away from said hemispherical surface in said housing.

3. A controlled friction shimmy-damping ball joint for use in an independent front wheel suspension comprising, a housing having a chamber therein with a segmental spherical surface at one end thereof, a friction member therein having an annular flat friction braking surface at one end and a hemispherical surface at the other end for coaction with the segmental spherical surface of said housing, said housing and said friction member having aligned apertures therethrough along the axis of said mating surfaces, a stud, said stud having a shank portion and a head portion, said shank portion passing through said apertures and said head portion coperating with said flat surface of said friction member to provide a frictional braking force thereagainst, a steering knuckle, fastening means connecting said stud to said steering knuckle, sealing means surrounding said stud and coacting with said housing and said knuckle, resilient friction force-controlling spring means compressed between said steering knuckle and said seal and between said housing and another portion of said seal whereby said seal is maintained in sealing relation with said housing and said knuckle, and said shank and said stud head are frictionally maintained against said friction member, a substantially rigid closure plate member secured in said housing and providing a top therefor opposite from said segmental spherical surface, said last named member being positioned closely adjacent the head of said stud for direct contact therewith on the side thereof opposite from said friction member and thereby preventing any substantial movement of said head and friction member away from said segmental, spherical surface.

4. In an independent steerable wheel suspension including pivotally mounted upper and lower control arms with a steering knuckle pivotally connected at the outer ends of said control arms, a shimmy-dampening ball joint connecting said steering knuckle with the upper control arm, said ball joint comprising, a housing including a chamber therein having a segmental spherical bearing surface at one end thereof, a friction damping member within said housing and having a planar friction damping surface and a segmental spherical surface for cooperation with said spherical surface of said housing, said friction dampening member having an aperture therethrough on the axis of said segmental spherical surface and in line with a corresponding aperture in said housing, a stud having a shank which passes through said apertures, and a head having an annular surface in a plane generally perpendicular to the axis of said shank and in cooperation with the friction damping surface on said friction member, said shank being affixed to said steering knuckle, sealing means in contact with said housing and said shank about said aperture in said housing, resilient spring means between said steering knuckle and said sealing means for biasing said sealing means against said housing and for simultaneously biasing said stud head against said friction dampening means, said spring means comprising the sole biasing means in said joint, a substantially rigid closure plate member secured in said housing and providing a top therefor, said last named member being positioned closely adjacent the head of said stud for direct contact therewith on the side thereof opposite from said annular surface thereof and thereby preventing any substantial movement of said head and friction member away from said segmental spherical bearing surface of said housing.

5. In an independent wheel suspension, a shimmy dampening joint comprising, a housing having a chamber therein, an aperture in said chamber, a stud extending into said chamber through said aperture, friction brake means attached to the end of the stud within said chamber and operative upon the application of force tending to move said stud out through said aperture, cooperating friction brake means in said chamber, sealing means surrounding said stud outside said chamber and cooperating with the external surface of said housing, means fastening said stud to a steering knuckle biasing means between the knuckle and said seal urging them apart, said biasing means comprising the sole means for applying said brake and maintaining said seal tightly closed, a substantially rigid closure plate member secured in said housing and providing a top therefor, said last named member being positioned closely adjacent the end of said stud for direct contact therewith on the side thereof remote from said aperture and thereby preventing any substantial movement of said stud axially relative to said housing.

6. In an independent wheel suspension having upper and lower control arms connected to a steering knuckle, a shimmy dampening joint comprising a housing secured to the upper control arm, said housing having a chamber therein, an aperture at the base of the chamber, a stud affixed to said steering knuckle and extending through said aperture into said chamber, brake means on said stud, said brake means facing said aperture for braking cooperation with brake means in said chamber when force is applied to move said stud out through said aperture, seal means surrounding said stud and cooperating with said housing, biasing means between said seal and said steerng knuckle uriging them apart and providing the sole brake applying force on said stud and sealing pressure on said seal, a substantially rigid closure plate member secured in said housing and providing a top therefor, said last named member being positioned closely adjacent the end of said stud within said housing for direct contact therewith for preventing any substantial movement of said stud through said aperture after assembly of said joint.

7. In an independent wheel suspension having an upper control arm member and a steering knuckle member, a shimmy-dampening joint therebetween comprising a housing secured to one of said members, a stud secured to the other of said members and passing through an aperture in said housing, an upwardly facing annular friction surface in said housing and surrounding said aperture, a downwardly facing friction surface on said stud cooperating therewith, a seal member surrounding said stud with one end lying against the outside of said housing and the other end lying against said steering knuckle, spring means positioned within said seal member and urging said seal member against both said housing and said steering knuckle, said spring means comprising the sole biasing force for forcing the friction surfaces together and for simultaneously holding said seal member securely against said housing and said steering knuckle to provide a dirt tight seal between the stud and the housing, a substantially rigid closure plate member secured in said housing and providing a top therefor, said last named member being positioned closely adjacent the end of said stud within said housing for positively preventing any substantial movement of said stud tending to separate said friction surfaces.

8. In an independent wheel suspension having an upper control arm member and a steering knuckle member, a shimmy-damping joint therebetween comprising a housing secured to one of said members, a stud secured to the other of said members and passing through an aperture in said housing, an upwardly facing annular friction surface in said housing and surrounding said aperture, a downwardly facing friction surface on said stud cooperating with said annular friction surface, a sheet metal seal member surrounding said stud and lying against the outside of said housing, a sheet metal washer positioned around said stud and against said knuckle, a resilient seal connecting said sheet metal seal and said washer and spring means positioned between said sheet metal seal and said washer whereby said spring means comprises the sole biasing force for forcing the friction surfaces together and for maintaining said sheet metal seal member against said housing and said washer against said knuckle to provide a completely dirt tight seal around said stud, a substantially rigid closure plate member secured in said housing and providing a top therefor, said last named member being positioned closely adjacent the end of said stud within said housing for direct contact therewith for preventing any substantial separation between said friction surfaces.

References Cited in the file of this patent

UNITED STATES PATENTS

| | | |
|---|---|---|
| 2,226,406 | Krotz | Dec. 24, 1940 |
| 2,455,343 | Slack et al. | Nov. 30, 1948 |
| 2,521,335 | Booth | Sept. 5, 1950 |
| 2,611,625 | Kishline et al. | Sept. 23, 1952 |

FOREIGN PATENTS

| | | |
|---|---|---|
| 597,641 | Great Britain | Jan. 30, 1948 |
| 645,627 | Great Britain | Nov. 1, 1950 |
| 484,935 | Germany | Oct. 25, 1929 |
| 489,036 | Germany | Jan. 11, 1930 |
| 719,047 | Germany | Mar. 27, 1942 |